(12) United States Patent
Tajima et al.

(10) Patent No.: US 6,626,580 B2
(45) Date of Patent: Sep. 30, 2003

(54) WHEEL BEARING ASSEMBLY

(75) Inventors: Eiji Tajima, Shizuoka (JP); Kazuhiro Azuma, Shizuoka (JP); Naoshi Kinpara, Shizuoka (JP)

(73) Assignee: NTN Corporation, Osaka (JP)

( * ) Notice: Subject to any disclaimer, the term of this patent is extended or adjusted under 35 U.S.C. 154(b) by 63 days.

(21) Appl. No.: 09/739,382

(22) Filed: Dec. 19, 2000

(65) Prior Publication Data

US 2001/0012419 A1 Aug. 9, 2001

(51) Int. Cl.[7] ............................................... F16C 19/08
(52) U.S. Cl. ....................................................... 384/544
(58) Field of Search ................................ 384/544, 537, 384/542, 506, 504, 589

(56) References Cited

U.S. PATENT DOCUMENTS 5,366,300 A * 11/1994 Deane et al. ............... 384/585
5,702,162 A * 12/1997 Pressler ...................... 384/571
6,196,639 B1 * 3/2001 Di Ponio et al. ......... 301/105.1

* cited by examiner

Primary Examiner—Lenard A. Footland
(74) Attorney, Agent, or Firm—Wenderoth Lind & Ponack, L.L.P.

(57) ABSTRACT

A wheel bearing assembly has a disk rotor for a brake integrally formed with a wheel-mounting flange of an inner member. Raceways opposite double-row raceways of the outer member are arranged on separate ring members pressed onto a tubular portion of the inner member. Thus, it is unnecessary to mount a brake rotor to the wheel bearing assembly, to reduce the number of parts, and to use different materials for the inner member and the inner ring members. For example, an FC-family cast iron, which is superior in seizure resistance, can be used for the inner member, and a tough bearing steel can be used for the ring member to achieve both excellent brake function and bearing function.

20 Claims, 7 Drawing Sheets

WHEEL BEARING ASSEMBLY

BACKGROUND OF THE INVENTION

This invention relates to a wheel bearing assembly with an automotive brake rotor.

There are automotive wheel bearing assemblies used for driving wheels and non-driving wheels. FIG. 7 shows a conventional wheel bearing assembly for a driving wheel. It comprises an outer member 63 provided with double-row raceways 61 and 62 on its inner periphery, an inner member 66 provided with double-row raceways 64 and 65 opposite the raceways 61 and 62 of the outer member 63, and double-row rolling elements 67 and 68 disposed between these opposed raceways 61, 64 and 62, 65.

A tubular portion 69 to be mounted to an axle side is provided at the inner periphery of the inner member 66, while a flange 70, to which is mounted a wheel, is provided at the outer peripheral side of inner member 66. Also, on the outer member 63, a flange 71 to be mounted to a vehicle body side is provided. The raceway 64 is on the outer side with respect to the center of the vehicle body, and is formed directly on the outer periphery of the tubular portion 69. The raceway 65 is on the side near to the center of the vehicle body (i.e., the inner side), and is formed on a separate inner ring member 72.

An automobile manufacturer will mount a disk rotor 73 for a separate brake part to the flange 70 by bolts 74, and a wheel is adapted to be mounted by bolts 75. As a material for the disk rotor 73, an FC-family cast iron, which is superior in seizure resistance, is ordinarily used. In the case of a drum brake, which is often used for a non-driving wheel, a drum such as a brake rotor is mounted to the flange 70.

As described above, with a conventional wheel bearing assembly, since it is necessary to mount a brake rotor (which is a separate part) to the wheel-mounting flange of the inner member, a great deal of work is needed for mounting and runout adjustment, and the number of parts is large.

Any runout of the brake rotor can cause vibrations or squeal during braking, or uneven wear of the brake rotor itself or the brake pad, thus worsening the vibration or squeal. Heretofore, automobile manufacturers to whom the wheel bearing assemblies are supplied have carried out the runout adjustment of the brake rotor, but such an adjustment is very troublesome and inefficient.

An object of this invention is therefore to provide a wheel bearing assembly which does not need mounting or runout adjustment of a brake rotor, and which has a small number of parts.

SUMMARY OF THE INVENTION

According to this invention, a wheel bearing assembly includes an outer member to be mounted to a vehicle body and formed with double-row raceways on the inner periphery thereof, and an inner member having at its inner peripheral end a tubular portion to be mounted to an axle and formed with double-row raceways opposite to the respective raceways of the outer member. Double-row rolling elements are arranged between the respective opposing raceways of the outer member and the inner member. The inner member has an integrally-formed wheel-mounting flange and an integrally-formed brake rotor so that the brake rotor and the flange are both integrally-formed portions of the inner member (i.e., the inner member with the wheel-mounting flange and the brake rotor is formed as a single unit).

By integrally forming the brake rotor with the wheel-mounting flange, it is unnecessary to mount a brake rotor and adjust runout, and the parts for mounting the brake rotor are eliminated.

By forming the double-row raceways of the inner member on one or two separate ring members, it is possible to use different materials for the inner member, which is formed integrally with a brake rotor, and the ring members. By using an FC-family cast iron (which is superior in seizure resistance) for the inner member, and a tough bearing steel for the ring members, it is possible to let excellent brake function and bearing function coexist with each other, reduce the amount of expensive bearing steel used and reduce the material cost.

The separate ring member may be divided into a first ring member and a second inner ring member, and the outer raceway with respect to the center of the vehicle body may be provided on the outer peripheral surface of the first outer ring member while the inner raceway with respect to the center of the vehicle body is provided on the outer peripheral surface of the second inner ring member. The first outer ring member is pressed onto the outer peripheral surface of the tubular portion of the inner member, and the second inner ring member may be a constant-velocity joint or a spindle mounted to the tubular portion. With this arrangement, it is possible to supply a constant-velocity joint or a spindle (which is a part to be coupled with an axle) to a customer, mounted beforehand on the wheel bearing assembly.

By forming the inner row of raceway of the second inner ring member on a separate inner ring member, it is possible to make only the separate inner ring member of an expensive bearing steel, ensure an excellent bearing function and reduce the material cost.

By mounting the second inner ring member to the tubular portion of the inner member by caulking, it is possible to reduce the weight compared with the conventional nut-tightening. Also, it is possible to more rigidly fix a constant-velocity joint or a spindle to the tubular portion of the inner member and to stably retain the raceways formed on their outer peripheral surfaces.

By integrally forming the vehicle body-mounting flange on the outer member, it is possible to supply it to a customer with a knuckle (a part to be coupled with the vehicle body) that is mounted beforehand on the wheel bearing assembly.

By restricting the maximum amount of runout of the braking surface of the brake rotor to within a predetermined value, it is possible to suppress any runout of the braking surface of the brake rotor during rotation. Also, troublesome runout adjustment at an automobile manufacturer can be eliminated. Thus it is possible to avoid the generation of vibration or squeak during braking and to prevent uneven wear of the brake rotor itself and the brake pad.

The maximum amount of runout of the braking surface of the brake rotor should be 100 $\mu$m. If it is 50 $\mu$m, the beneficial effect will be increased.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENT

Figure 1:
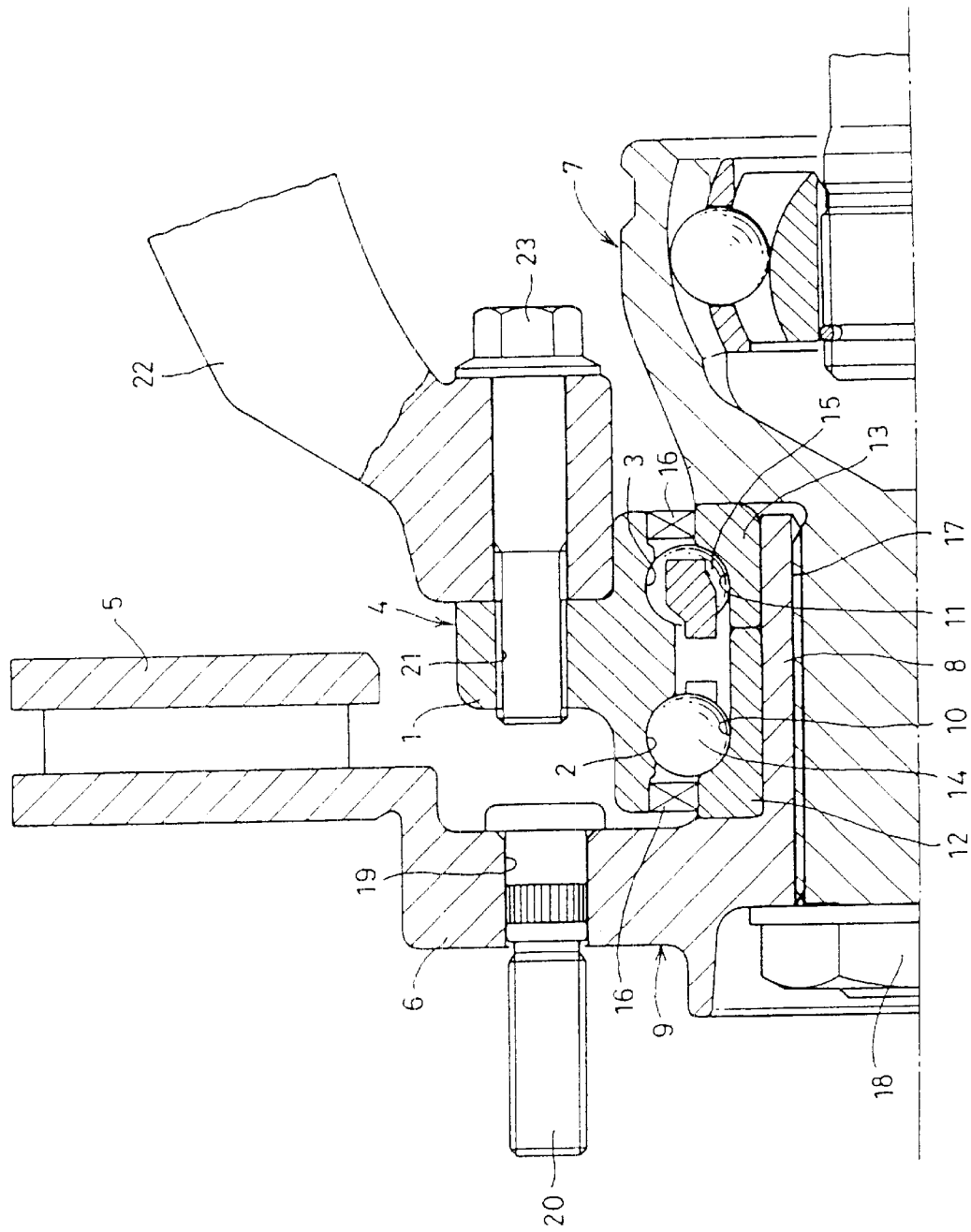
FIGS. 1–5 are vertical sectional views showing wheel bearing assemblies of first to fifth embodiments.

Embodiments of this invention are described based on FIGS. 1–5, and FIG. 1 shows a first embodiment. This wheel bearing assembly is for a driving wheel, and comprises an outer member 4 formed with a flange 1 for mounting the outer member 4 to a vehicle body at the outer peripheral side, and formed with double-row raceways 2, 3 on its inner periphery. An inner member 9 has an integral wheel-mounting flange 6, which is integral with a brake disk rotor 5 on its outer peripheral side (i.e., the wheel-mounting flange 6 and brake disk rotor 5 have a one-piece construction) and integral with a tubular portion 8 at its inner peripheral end, to which is mounted a constant-velocity joint 7 at the axle end (i.e., the wheel-mounting flange 6, the brake disk rotor 5, and the tubular portion 8 are integrally formed as a single unit so as to have a one-piece construction). Two ring members 12 and 13 have respective raceways 10 and 11 opposing the raceways 2 and 3 of the outer member 4, respectively, and the ring members 12 and 13 are pressed onto the outer peripheral surface of the tubular portion 8. Double-row rolling elements 14 and 15 disposed between these opposed raceways 2, 10 and 3, 11, respectively.

The inner member 9 is made of an FC-family cast iron, while the outer member 4 and the ring members 12 and 13 are made of bearing steel. Also, at both ends of the bearing portion where the rolling elements 14, 15 are disposed, seal members 16 are fitted.

The constant-velocity joint 7 is fitted in a spline hole 17 formed in the tubular portion 8 of the inner member 9, and is fixed by a nut 18. The wheel is mounted by bolts 20 fitted in holes 19 formed in the flange 6. Also, in a bolt hole 21 provided in the flange 1 of the outer member 4, a knuckle 22 for connecting the outer member 4 to the vehicle body is mounted by bolts 23.

Figure 2:
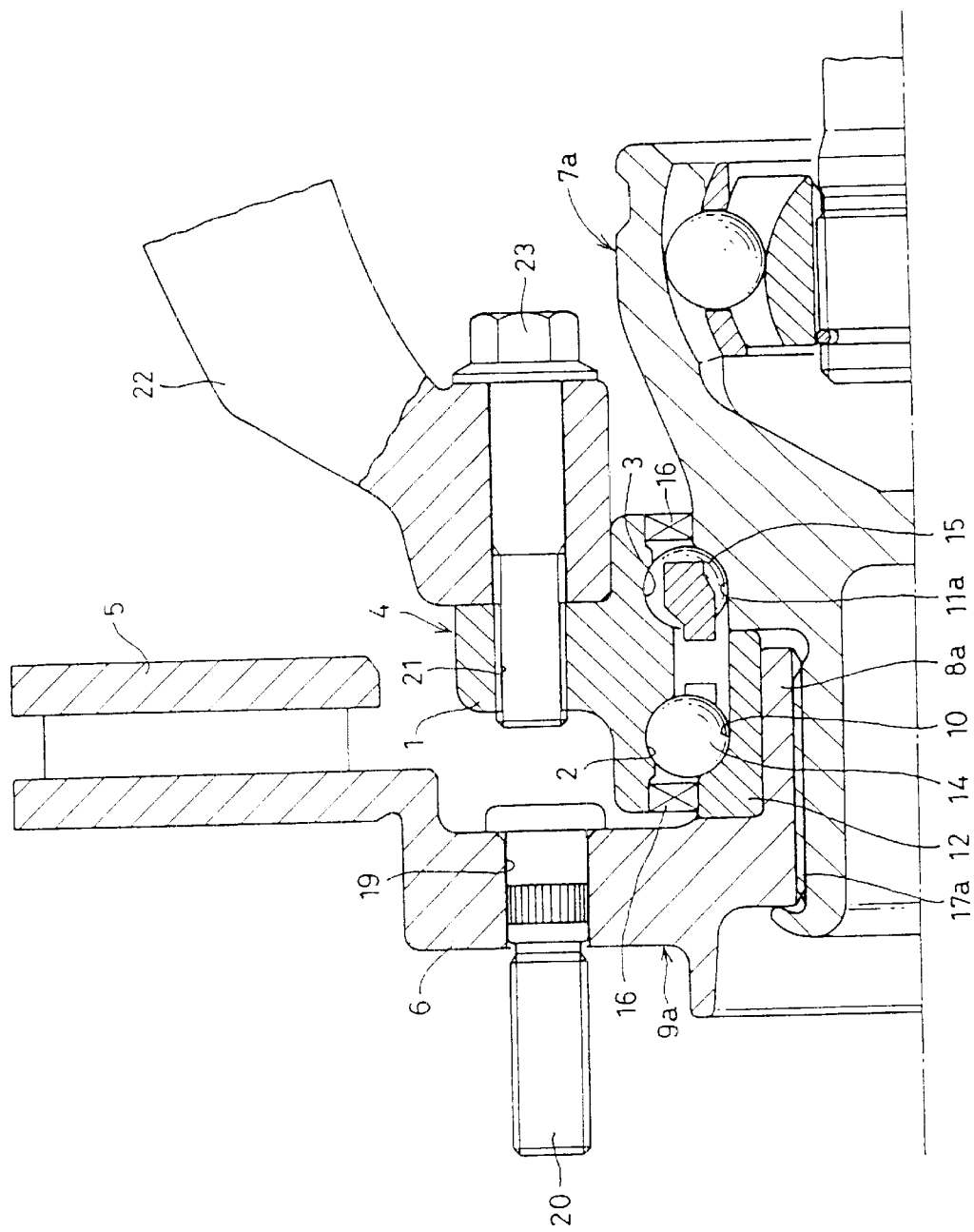

FIG. 2 shows a second embodiment. This wheel bearing assembly is also for a driving wheel. A constant velocity joint 7a fitted in a spline hole 17a of a tubular portion 8a is fixed by caulking. The tubular portion 8a of the inner member 9a is formed slightly shorter than in the first embodiment. The inner raceway 11a on the side nearest to the center of the vehicle body is directly provided on the outer peripheral surface of the constant-velocity joint 7a. Other portions are the same as in the first embodiment and are indicated by the same symbols as used in FIG. 1.

Figure 3:
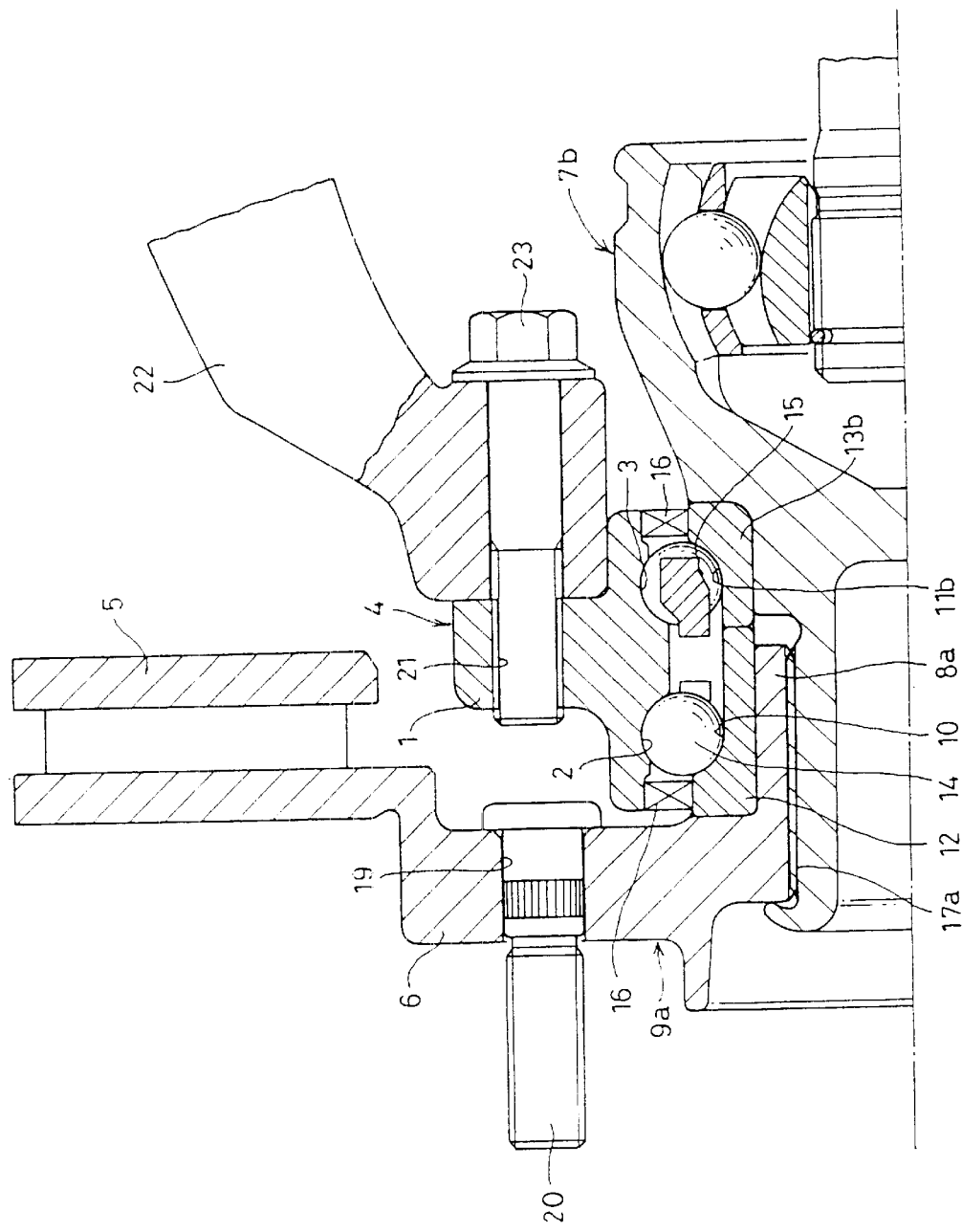

FIG. 3 shows a third embodiment. This wheel bearing assembly is also for a driving wheel. The inner raceway 11b on the side nearest to the center of the vehicle body is provided on a separate inner ring member 13b pressed onto the outer peripheral surface of the constant-velocity joint 7b. Other portions are the same as in the second embodiment and are indicated by the same symbols as used in FIG. 2.

Figure 4:
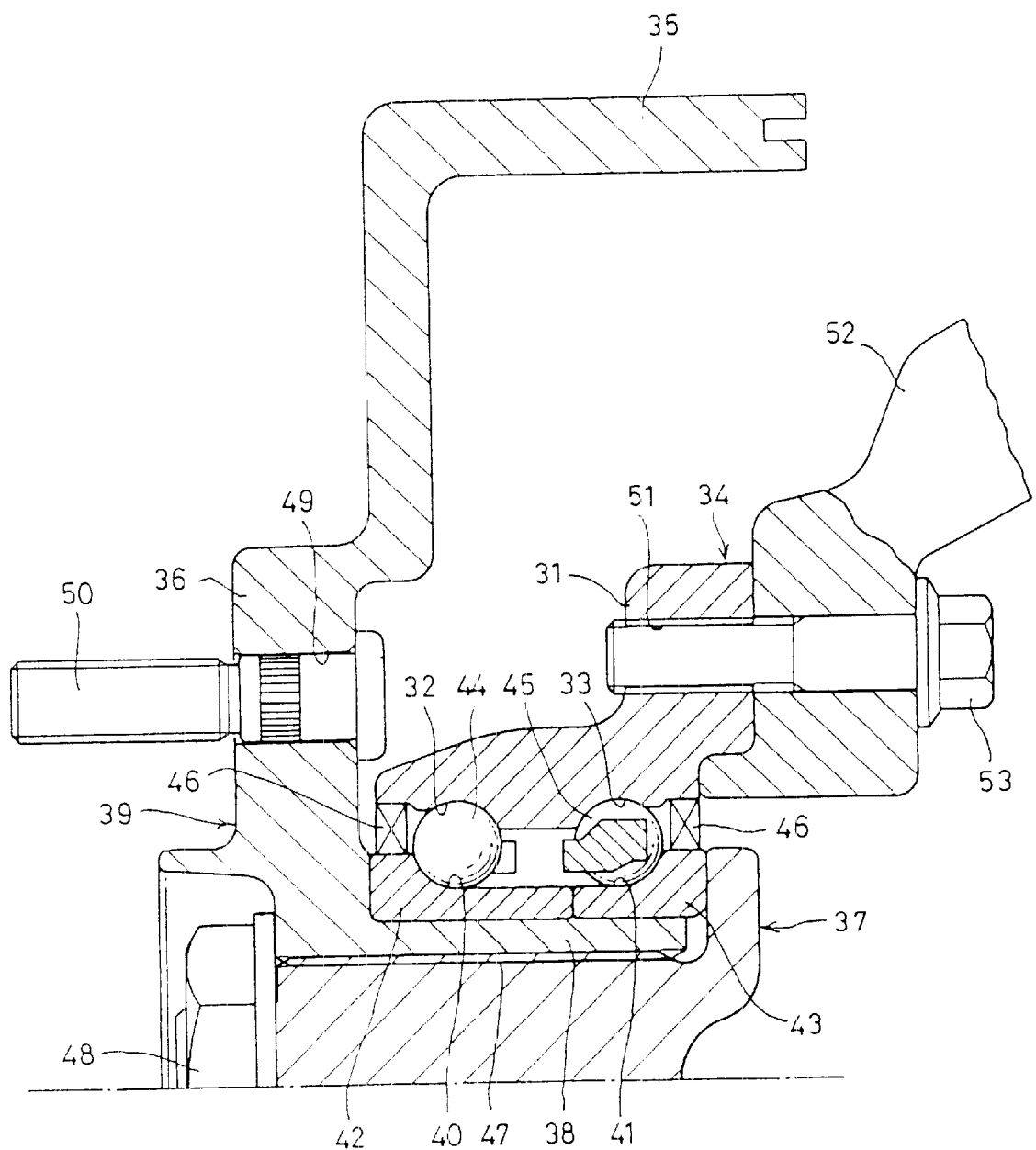

FIG. 4 shows a fourth embodiment. This wheel bearing assembly is for a non-driving wheel and comprises an outer member 34 formed with a flange 31 for mounting the outer member 34 to a vehicle body on the outer peripheral side, and formed with double-row raceways 32, 33 on its inner periphery. An inner member 39 has an integral wheel-mounting flange 36, which is integral with a brake drum 35 on its outer peripheral side, and has a tubular portion 38 at its inner peripheral end to which is mounted a spindle 37 at the axle end. Two inner ring members 42 and 43 have respective raceways 40 and 41 opposing the raceways 32 and 33 of the outer member 34, respectively, and the ring members 42 and 43 are pressed onto the outer peripheral surface of the tubular portion 38 of the inner member 39. Double-row rolling elements 44 and 45 are disposed between these opposed raceways 32, 40 and 33, 41, respectively.

The inner member 39 is made of an FC-family cast iron, while the outer member 34 and the ring members 42, 43 are made of a bearing steel. At both ends of the bearing portion where the rolling elements 44, 45 are disposed, seal members 46 are fitted.

The spindle 37 is fitted in a spline hole 47 provided in the tubular portion 38 of the inner member 39, and is fixed by a nut 48. The wheel is mounted by bolts 50 fitted in a hole 49 provided in the flange 36. Also, in a bolt hole 51 provided in the flange 31 of the outer member 34, a knuckle 52 for connecting the outer member 34 to the vehicle body is mounted by bolts 53.

Figure 5:
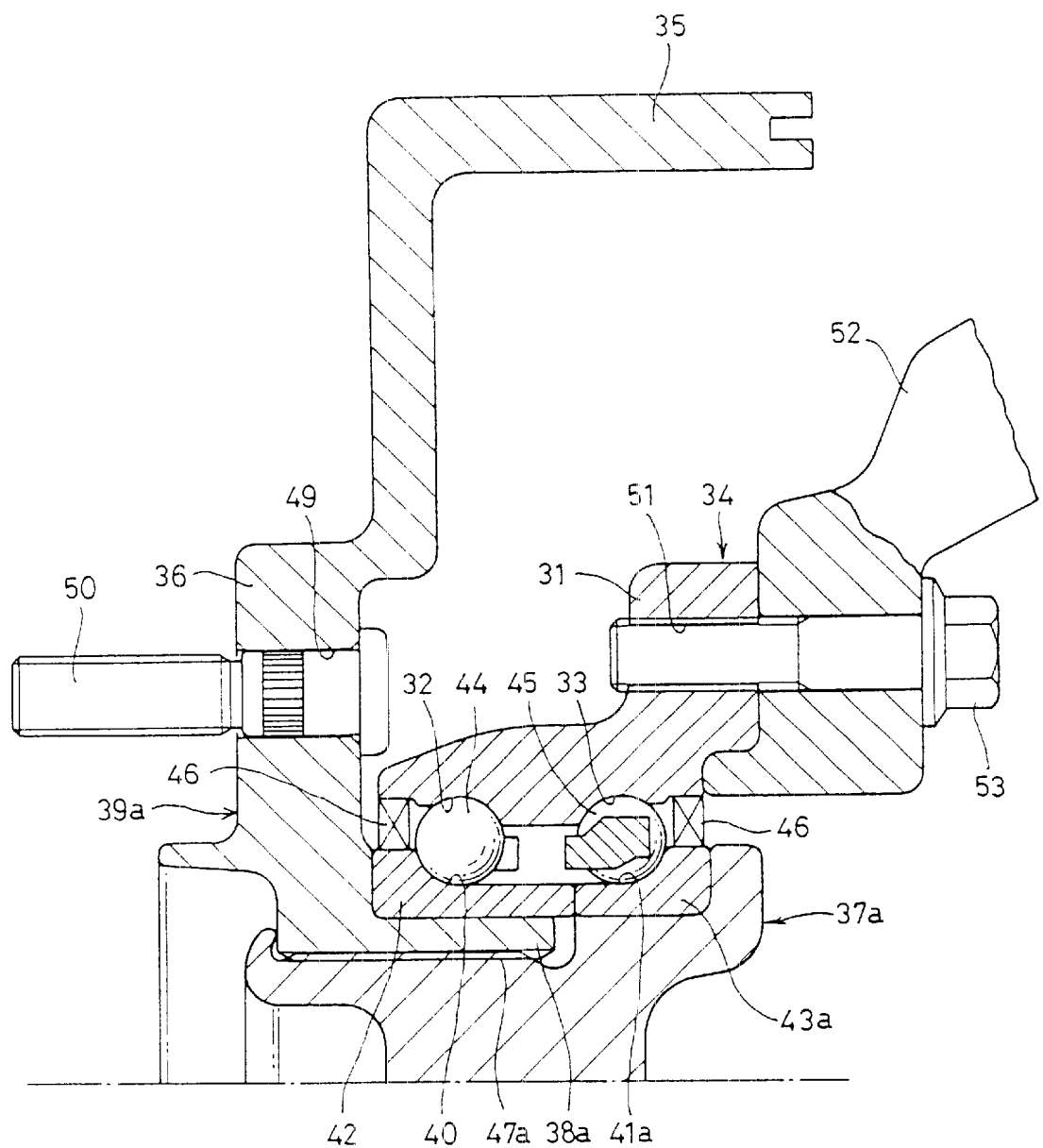

FIG. 5 shows a fifth embodiment. This wheel bearing assembly is also for a non-driving wheel. A spindle 37a fitted in a spline hole 47a of a tubular portion 38a is fixed by caulking. The tubular portion 38a of the inner member 39a is formed slightly shorter than in the fourth embodiment. An inner ring member 43a formed with an inner raceway 41a on the side nearest to the center of the vehicle body is pressed onto the outer peripheral surface of the spindle 37a. Other portions are the same as in the fourth embodiment and are indicated by the same symbols as used in FIG. 4. The inner raceway 41a may be directly formed on the outer peripheral surface of the spindle 37a.

Figure 6:
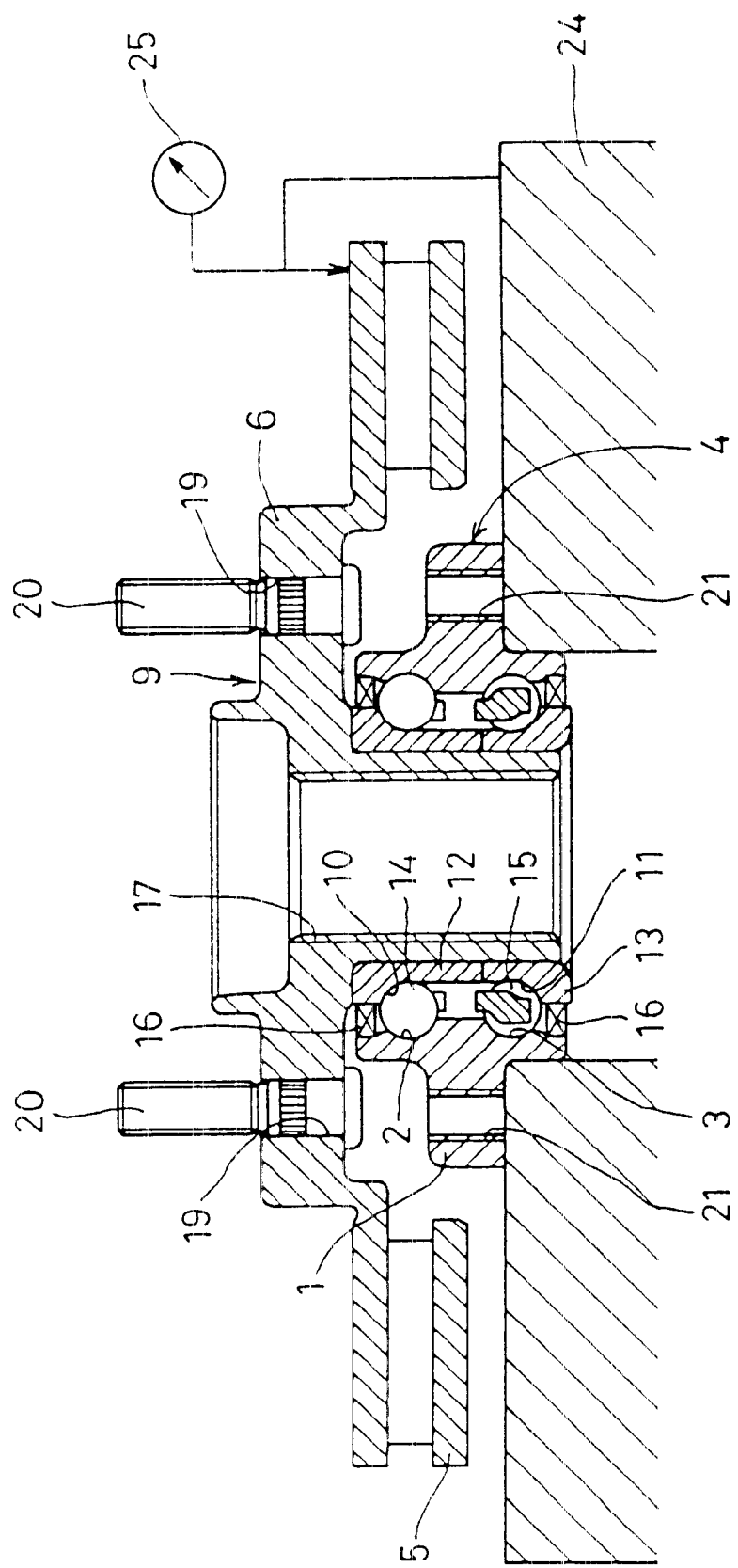
FIG. 6 is a vertical sectional view showing how the runout of the braking surface of the brake rotor shown in FIG. 1 is measured.
Figure 7:
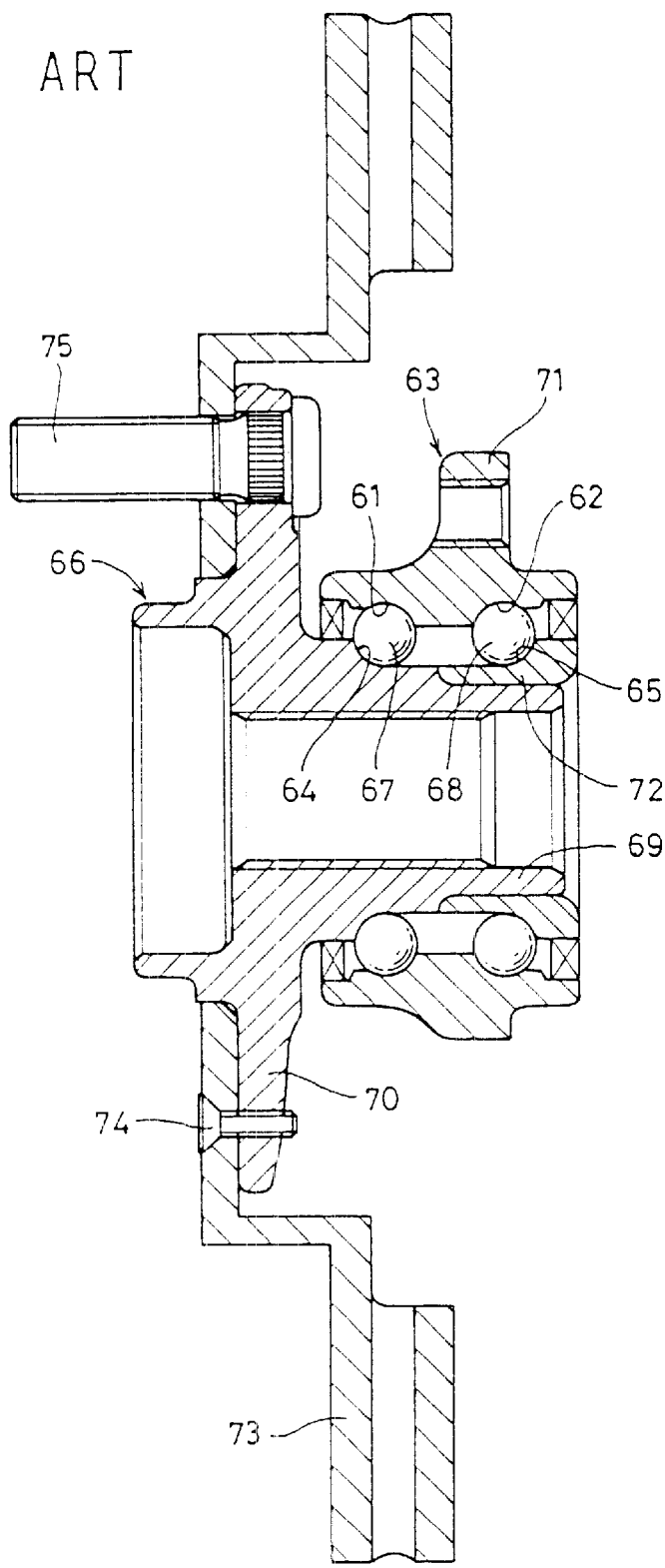
FIG. 7 is a vertical sectional view of a conventional wheel bearing assembly.

FIG. 6 shows how the runout (i.e., circumferential flatness) of the braking surface of the brake rotor 5 was measured. The wheel bearing assembly was mounted with the outer member 4 fixed to a bench 24 so that the inner member 9 can be rotated with respect to the outer member 4. In this state, the inner member 9 was turned 360° and the runout of the braking surface of the brake rotor 5 was measured by a dial gauge 25. Since runout is greater at the radially outer portion, the runout was measured with the dial gauge 25 abutting the braking surface of the brake rotor 5 at the radially outer portion for more strict runout control.

The maximum amount of runout of the braking surface of the brake rotor should be 100 $\mu$m. If it is 50 $\mu$m, the beneficial effect will be increased.

As described above, with the wheel bearing assembly of this invention, a brake rotor is integrally formed with the wheel mounting flange of the inner member for mounting a wheel. Thus, the mounting of a brake rotor and runout adjustment are eliminated, and it is possible to reduce the number of parts.

Also, by forming the portion where the double-row raceways of the inner member are to be formed on one or two separate ring members, it is possible to use different materials for the inner member body, which is formed integrally with a brake rotor, and the ring members. By using an FC-family cast iron, which is superior in seizure resistance, for the inner member, and a tough bearing steel for the ring members, it is possible to achieve both excellent brake function and bearing function, reduce the amount of use of an expensive bearing steel and reduce the material cost.

Further, by dividing the ring member into a first outer ring member and a second inner ring member, utilizing the constant-velocity joint or spindle mounted to the tubular portion of the inner member as the second inner ring member, and providing the raceway on the side near to the center of the vehicle body on its outer peripheral surface, it is possible to supply it to a customer with a constant-velocity joint or a spindle, which is a connecting part with the axle, mounted beforehand on the wheel bearing assembly.

Also, by forming the portion on which the inner raceway of the second inner ring member is to be provided on a separate ring member, it is possible to ensure an excellent bearing function and reduce the material cost.

By using caulking for the mounting on the tubular portion of the second inner ring member, it is possible to reduce the weight compared with the conventional nut-tightening method. Also, it is possible to more rigidly fix a constant-velocity joint or a spindle to the tubular portion of the inner member and to stably retain the raceways formed on the outer peripheral surfaces.

By integrally forming the vehicle body-mounting flange on the outer member, it is possible to supply it to a customer with a knuckle, which is a connecting part with the vehicle body, mounted beforehand on the wheel bearing assembly.

By restricting the maximum amount of runout of the braking surface of the brake rotor to within a predetermined value, it is possible to suppress any runout of the braking surface of the brake rotor during rotation. Also, troublesome runout adjustment at an automobile manufacturer can be eliminated. Thus it is possible to avoid the production of vibration or squeak at braking and prevent uneven wear of the brake rotor itself and the brake pad.

What is claimed is:

1. A wheel bearing assembly comprising:
    an outer member to be mounted to a vehicle body, said outer member having an inner peripheral surface and double-row raceways formed on said inner peripheral surface;
    an inner member having:
        a tubular portion to be mounted to an axle, said tubular portion having an outer peripheral surface facing said inner peripheral surface of said outer member;
        a wheel-mounting flange; and
        a brake rotor integrally formed with said wheel-mounting flange so that said brake rotor and said wheel-mounting flange have a one-piece construction; and
    a pair of rolling elements each arranged within a respective one of said double-row raceways of said outer member.

2. The wheel bearing assembly of claim 1, further comprising at least one ring member abutting against said outer peripheral surface of said inner member, said at least one ring member being formed separately from said inner member, at least one raceway being formed on said at least one ring member so as to oppose a respective one of said double-row raceways of said outer member, at least one of said pair of rolling elements being arranged between a respective one of said double-row raceways of said outer member and a respective opposing one of said at least one raceway of said at least one ring member.

3. The wheel bearing assembly of claim 2, wherein double-row raceways are formed on said at least one ring member so as to oppose said double-row raceways of said outer member, respectively, each of said pair of rolling elements being arranged between a respective one of said double-row raceways of said outer member and a respective opposing one of said double-row raceways of said at least one ring member.

4. The assembly of claim 3, wherein said outer member has an integrally-formed flange to be mounted to a vehicle body, wherein said outer member has a one-piece construction including said flange.

5. The wheel bearing assembly of claim 3, wherein said brake rotor has a brake surface, said brake surface having a circumferential flatness no greater than 100 μm.

6. The wheel bearing assembly of claim 3, wherein said at least one ring member comprises an outer ring member and an inner ring member, said double-row raceways of said at least one ring member comprising an outer raceway formed on an outer peripheral surface of said outer ring member and comprising an inner raceway formed on an outer peripheral surface of said inner ring member.

7. The wheel bearing assembly of claim 6, wherein said outer ring member is pressed against said outer peripheral surface of said tubular portion of said inner member, and wherein said inner ring member comprises one of a constant-velocity joint and a spindle mounted against said tubular portion of said inner member.

8. The wheel bearing assembly of claim 7, wherein said outer ring member is pressed against and mounted to said outer peripheral surface of said tubular portion of said inner member by caulking.

9. The wheel bearing assembly of claim 8, wherein said outer member has an integrally-formed flange to be mounted to a vehicle body, wherein said outer member has a one-piece construction including said flange.

10. The wheel bearing assembly of claim 8, wherein said brake rotor has a brake surface, said brake surface having a circumferential flatness no greater than 100 μm.

11. The wheel bearing assembly of claim 7, wherein said outer member has an integrally-formed flange to be mounted to a vehicle body, wherein said outer member has a one-piece construction including said flange.

12. The wheel bearing assembly of claim 7, wherein said brake rotor has a brake surface, said brake surface having a circumferential flatness no greater than 100 μm.

13. The wheel bearing assembly of claim 6, wherein said outer ring member is pressed against said outer peripheral surface of said tubular portion of said inner member, and said inner ring member is pressed against one of a constant-velocity joint and a spindle mounted against said tubular portion of said inner member.

14. The wheel bearing assembly of claim 13, wherein said outer ring member is pressed against and mounted to said outer peripheral surface of said tubular portion of said inner member by caulking.

15. The wheel bearing assembly of claim 13, wherein said outer member has an integrally-formed flange to be mounted to a vehicle body, wherein said outer member has a one-piece construction including said flange.

16. The wheel bearing assembly of claim 13, wherein said brake rotor has a brake surface, said brake surface having a circumferential flatness no greater than 100 μm.

17. The wheel bearing assembly of claim 1, wherein said outer member has an integrally-formed flange to be mounted to a vehicle body, wherein said outer member has a one-piece construction including said flange.

18. The wheel bearing assembly of claim 17, wherein said brake rotor has a brake surface, said brake surface having a circumfenrential flatness no greater than 100 μm.

19. The wheel bearing assembly of claim 1, wherein said brake rotor has a brake surface, said brake surface having a circumferential flatness no greater than 100 μm.

20. The wheel bearing assembly of claim 19, wherein said brake surface has a circumferential flatness no greater than 50 μm.

* * * * *